(12) United States Patent
Kim et al.

(10) Patent No.: US 11,776,133 B2
(45) Date of Patent: Oct. 3, 2023

(54) SYSTEM AND METHOD FOR DELIVERING CONTENT BASED ON MOVING ROUTE PREDICTION

(71) Applicant: FOUNDATION FOR RESEARCH AND BUSINESS, SEOUL NATIONAL UNIVERSITY OF SCIENCE AND TECHNOLOGY, Seoul (KR)

(72) Inventors: Dong Ho Kim, Seoul (KR); Ji Won Kim, Seoul (KR); Soo Hyun Jeon, Seoul (KR)

( * ) Notice: Subject to any disclaimer, the term of this patent is extended or adjusted under 35 U.S.C. 154(b) by 0 days.

(21) Appl. No.: 17/581,924

(22) Filed: Jan. 23, 2022

(65) Prior Publication Data

US 2023/0133228 A1 May 4, 2023

(30) Foreign Application Priority Data

Oct. 29, 2021 (KR) .......................... 10-2021-0146904
Jan. 12, 2022 (KR) .......................... 10-2022-0004411

(51) Int. Cl.
*G06T 11/00* (2006.01)
*G06T 7/223* (2017.01)
*G06T 7/70* (2017.01)

(52) U.S. Cl.
CPC ................ *G06T 7/223* (2017.01); *G06T 7/70* (2017.01); *G06T 11/00* (2013.01); *G06T 2207/30196* (2013.01)

(58) Field of Classification Search
CPC .................................. G06T 7/70; G06T 11/00
See application file for complete search history.

(56) References Cited

U.S. PATENT DOCUMENTS

2016/0358358 A1* 12/2016 Fujio ...................... G06T 11/60
2019/0356894 A1* 11/2019 Oh .................. H04N 21/234345

FOREIGN PATENT DOCUMENTS

KR      10-1887053 B1    8/2018

\* cited by examiner

*Primary Examiner* — Samantha (Yuehan) Wang

(57) ABSTRACT

A system and method for delivering moving route prediction-based content is provided, in terms of a server, as a user terminal allows producing an image at the future time point, at the user's final position, which is predicted, based on a total delay time of a network, rather than producing images at every time point, it is possible to reduce the data amount required for creating the content, and as the image produced at the user's final position according to the user moving route is stored in the buffer, it is possible to provide smooth content service without delay. In addition, the user may experience virtual reality as a 360° image suitable for the user's moving position from the user's point of view is played through a HMD of the user terminal S1, and the user may also use a lively content by making the 360° image stereoscopic.

9 Claims, 7 Drawing Sheets

SYSTEM AND METHOD FOR DELIVERING CONTENT BASED ON MOVING ROUTE PREDICTION

BACKGROUND OF THE INVENTION

Field of the Invention

The present invention relates to a system and method for delivering moving route prediction-based content and, more particularly, to a system and method for delivering moving route prediction-based content, in which, as a user moving route is predicted, an image is produced at a user viewport and a user's final position according to the predicted moving route in consideration of a network delay time, and the produced image is delivered, only images are produced at the user viewpoint and the user's final position, which are predicted at the future time point according the network delay time, thereby reducing the data amount compared to the data amount required to produce images at all viewpoints, and thus reducing load in the network due to delivery of the image.

Description of the Related Art

Recently, research on providing an AR or VR image is being actively conducted and being used in various forms. For example, people had to visit places such as museums, art galleries, zoos, and exhibitions in the past. Because VR image is actually displayed to a user as if the user were actually seeing an object, techniques are being developed to make it possible to allow the user to watch the image through a computer or VR device.

However, the VR image provided in a virtual space capable of viewpoint movement is needed to be selectively moved within a certain time point and to be prepared at all viewpoints, which results in requiring much data.

In addition, there is a disadvantage that the VR image is provided only at a certain time point and is not provided in real time at a position that is actively changed according to the user's movement.

DOCUMENTS OF RELATED ART (Patent Document 1) Korean Patent application registration No. 10-1887053 (System for analysis of interest in VR image)

SUMMARY OF THE INVENTION

Accordingly, the present invention has been made keeping in mind the above problems occurring in the prior art, and an objective of the present invention is to provide a system and method for delivering moving route prediction-based content, in which, as a user moving route is predicted, an image is produced at a user viewport according to the predicted moving route in consideration of a network delay time, and the produced image is delivered, only images are produced at the user's final position and a future time point, whereby the data amount can be reduced compared to the data amount required to produce images at all viewpoints, and thus the network load can be reduced due to the delivery of the produced image.

The objective of the present invention is not limited to the above-mentioned objective, and other objectives and advantages of the present invention can be understood by the following description, and will be more clearly understood by the examples of the present invention. In addition, it will also be readily apparent that the objectives and advantages of the present invention can be realized by the means and combinations thereof indicated in the appended claims.

According to an embodiment of the present invention, a system for delivering moving route prediction-based content is provided, the system including at least one user terminal that receives and plays content created by a server, the sever comprising: a future time point setting unit setting a future time point based on a total delay time of a network; a user's final position prediction unit predicting a user's final position at a future time point based on a user position and a user viewport at a current time point; and a content creation unit creating content at the user's final position predicted.

Preferably, the future time point setting unit may be configured to set the future time point based on the total delay time of the network, including a content delivery time, a ping time of a simple round-trip time when the content is delivered, and a decoding time performed by the user terminal.

Preferably, the user's final position prediction unit may include: a user moving position derivation module predicting the user's position at the future time point (Tk+1) based on a user position at the current time point (Tk), a user position at the future time point (Tk+1), a user's moving speed, and a movement direction; a user's movement viewport derivation module predicting the user viewport at the future time point (Tk+1) based on a user's head position at the current time point (Tk), a user's head position in vertical and vertical directions at the future time point (Tk+1), and a movement angular velocity of a user's head; and a user final position derivation module deriving the user's final position at the future time point, based on an image in which the user's movement position at the future time point (Tk+1), the user's movement viewport at the future time point (Tk+1), and an object in a region of interest (ROT) of a user are contained.

Preferably, the user final position derivation module may be configured to set a range of a prediction window in an image at the future time point based on the previous window in an image at the previous time point in which an object of interest of a user is contained; predict a user moving route based on a moving direction of the object of interest in the prediction window in the image at the future time point and the previous window in the image at the previous time point, user's movement position and movement viewport, and the importance of the object of interest; and derive the user's final position at the future time point based on the user moving route.

Preferably, the content creation unit may include: a content creation module creating content at the user's final position; and a buffer storing image segments of the created content at the future time point and then sequentially delivering the stored content to the user terminal through the network.

Preferably, the content creation unit may further include a verification module that is configured to divide the virtual space of the created content into blocks of a predetermined unit, and then compare a block at the user's final position with a block at the user's actual position; and determine that the verification of the user's final position is successful when the comparison results in a match, and then sequentially deliver the image segments stored in the buffer at the future time point.

Preferably, the verification module may be configured to determine that the verification of the user's final position is not successful when the comparison results in a non-match, and delete the created content at the future time point and then repeatedly perform prediction of the user's final position at the future time point.

According to another embodiment of the present invention, a method of delivering moving route prediction-based content using at least one user terminal that receives and plays content created by a server is provided, the method including: setting a future time point based on a total delay time of a network; predicting a user's final position including a user position and a user viewport at a future time point based on a user position and a user viewport at a current time point; and creating content at the user's final position.

Preferably, the setting of the further time point may include setting the future time point based on the total delay time of the network, including a content delivery time, a ping time of a simple round-trip time when the content is delivered, and a decoding time performed by the user terminal.

Preferably, the predicting of the user's final position may include deriving the user's final position, based on an image in which the user's movement position at the future time point (Tk+1), the user movement viewport at the future time point (Tk+1), and an object in a region of interest of a user are contained.

Preferably, the deriving of the user's final position may include, when deriving the user's final position, based on an image in which the user's movement position at the future time point (Tk+1), the user movement viewport at the future time point (Tk+1), and an object in a region of interest of a user are contained, setting a range of a prediction window in an image at the future time point based on the previous window in an image at the previous time point in which an object of interest of a user is contained; predicting a user moving route based on a moving direction of the object of interest in the prediction window in the image at the future time point and the previous window in the image at the previous time point, user's movement position and movement viewport, and the importance of the object of interest; and deriving the user's final position at the future time point based on the user moving route.

According to an embodiment, in terms of a server, a user terminal allows producing an image at the future time point, at the user's final position, which is predicted, in consideration of a total delay time of a network, rather than producing images at every time point, it is possible to reduce the data amount required for creating the content. As the image produced at the user's final position according to the user moving route is stored in the buffer, it is possible to provide smooth content service without delay.

In addition, the user may experience virtual reality as a 360° image suitable for the user's moving position from the user's point of view is played through a HMD of the user terminal S1, and the user may also use a lively content by making the 360° image stereoscopic.

BRIEF DESCRIPTION OF THE DRAWINGS

The accompanying drawings with respect to the specification illustrate preferred embodiments of the present invention and serve to further convey the technical idea of the present invention together with the description of the present invention given below, and accordingly, the present invention should not be construed as limited only to descriptions in the drawings, in which.

DESCRIPTION OF THE PREFERRED EMBODIMENTS

Figure 1:
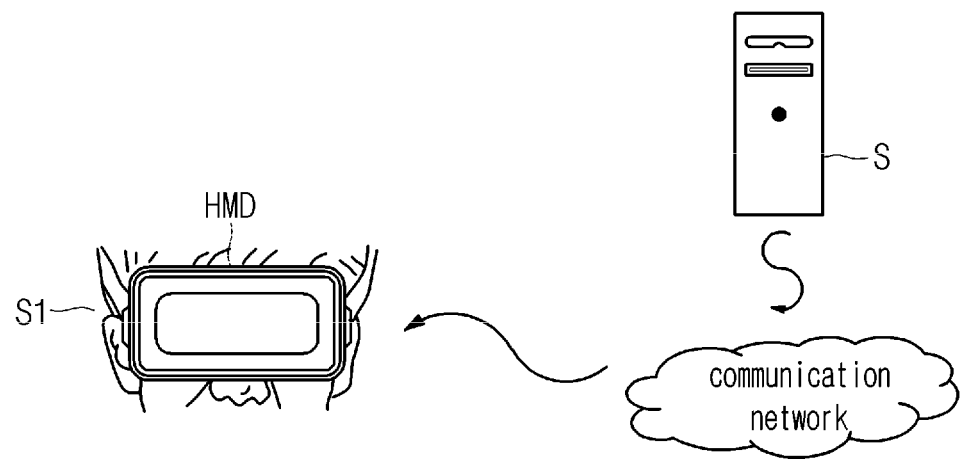
FIG. 1 is a block diagram of a content creation system to which an embodiment is applied.

Hereinafter, with reference to the accompanying drawings, the embodiments of the present invention will be described in detail so that those of ordinary skill in the art to which the present invention pertains can easily implement them. However, the present invention may be embodied in several different forms and is not limited to the embodiments described herein. In order to clearly explain the present invention in the drawings, parts irrelevant to the description are omitted, and similar reference numerals are attached to similar parts throughout the specification.

An embodiment according to the present invention will be described in detail, which is configured to predict user's position moving route and viewpoint moving route on the basis of a user viewpoint, a moving direction, and a moving speed at the current time point, to create content at a future time point on the basis of the user's position moving route and viewpoint moving route, and to deliver the created content to the user terminal.

Figure 2:
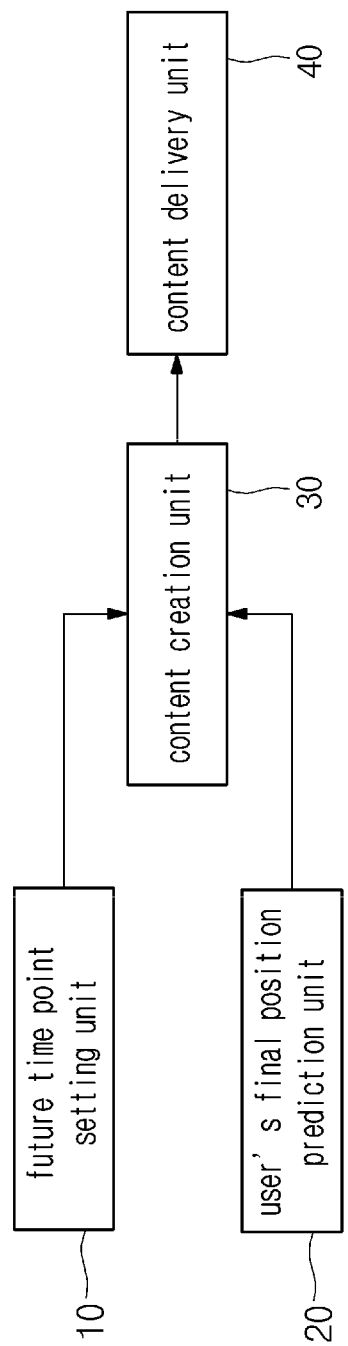
FIG. 2 is a detailed configuration diagram of a server of FIG. 1.
Figure 3:
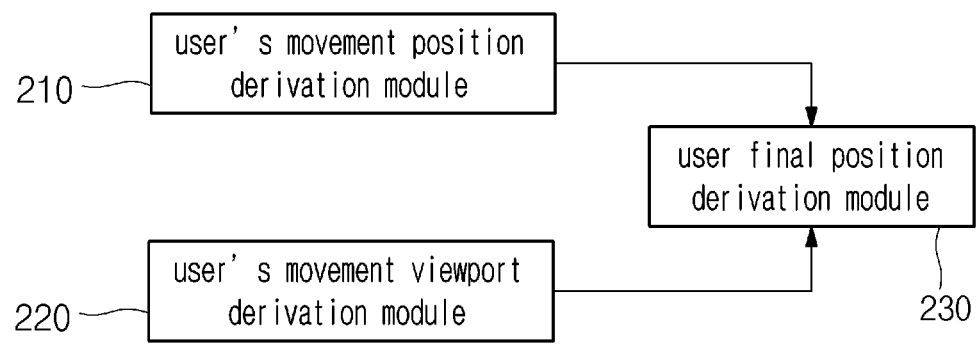
FIG. 3 is a detailed configuration diagram of a user's final position prediction unit of FIG. 2.
Figure 4:
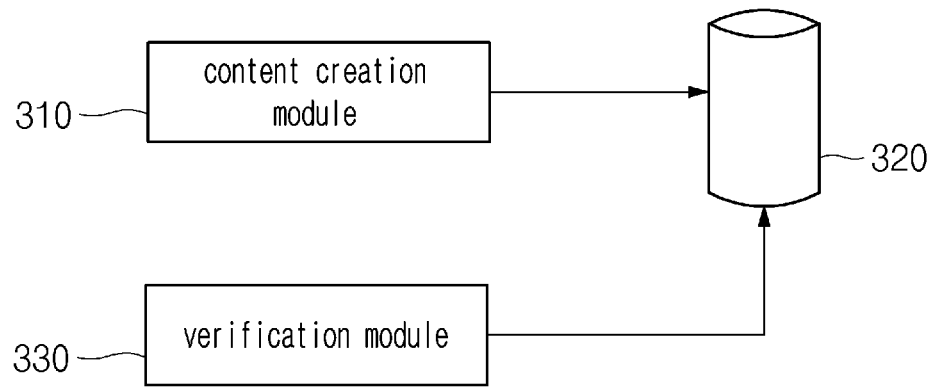
FIG. 4 is a detailed configuration diagram of a content creation unit of FIG. 2.
Figure 5:
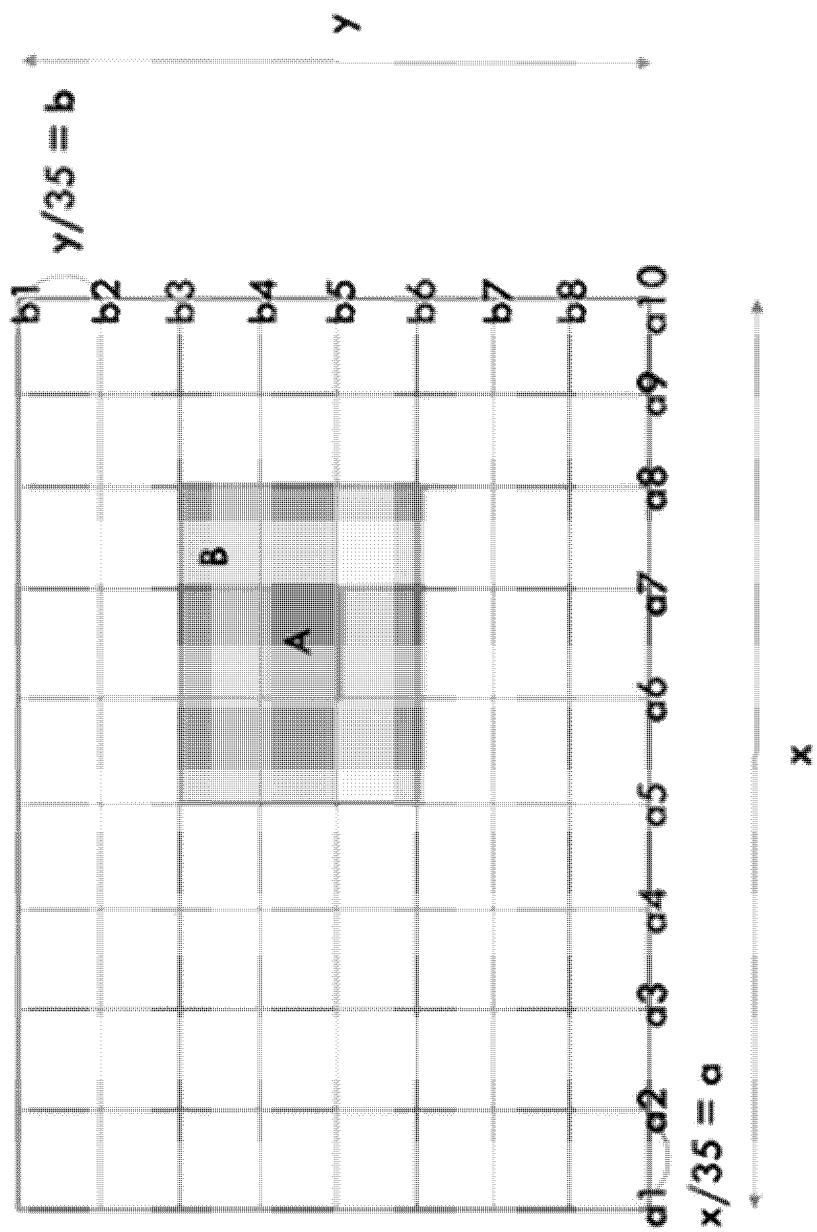
FIG. 5 is an exemplary view showing a unit block of a verification module of FIG. 4.

FIG. 1 is a block diagram of a content creation system to which an embodiment is applied; FIG. 2 is a detailed configuration diagram of the server of FIG. 1; FIG. 3 is a detailed configuration diagram of the user's final position prediction unit of FIG. 2; FIG. 4 is a detailed configuration diagram of the content creation unit of FIG. 2; and FIG. 5 is an exemplary view showing a unit block of the verification module of FIG. 4. Referring to FIGS. 1 to 5, the system for delivering moving route prediction-based content according to an embodiment includes at least one user terminal S1 and a server S.

The server S is configured to predict the user's final position at a future time point that is set on the basis of a total network delay time, create content in the user's final position at the future time point, which is predicted, and transmit the same to at least one user terminal S1. The server S may include a future time point setting unit 10, a user final position prediction unit 20, a content creation unit 30, and a content delivery unit 40. According to an embodiment, the future time point setting unit 10, the user final position prediction unit 20, the content creation unit 30, and the content delivery unit 40 may be provided as separate devices in one server S as shown in FIG. 1, but is not limited thereto.

The future time point setting unit 10 may derive the total network delay time needed to deliver the content and derive the number of frames in the content during the derived total delay time.

That is, since a ping (simple round-trip delay) time is 5 to 7 ms in a wired network and the ping time is 40 to 50 ms in wireless networks such as LTE, when sending images over the wired network, the future time point setting unit 10 calculates the content delivery time at Packet Length/Link Bandwidth and obtains the total delay time by summing the calculated content delivery time, the ping time, and decoding time.

In addition, one frame is maintained for about 17 ms on the basis of image of 60 frames per second, so that the number of image frames consumed during the total delay time may be derived as a total delay time/17 ms.

Accordingly, according to an embodiment, the future time point is set using the total delay time, and an image to be played back at the set future time point is produced and delivered. Therefore, the image delivered through the network is an image at the future time point, which is produced after performing compensation for the image frames consumed during the total delay time.

Therefore, the future time point is set after the image frame is consumed for the total delay time, and the image is produced at the future time point and delivered to at least one user terminal S1.

Meanwhile, the user final position creation unit 20 may include a user's movement position derivation module 210, a user's movement viewport derivation module 220, and a user final position derivation module 230 with reference to FIG. 2. The user's final position prediction unit 20 predicts the user's final position at the future time point. Here, the user's final position includes a user position and a user viewport at the future time point, based on an image for an object in a region of interest of a user.

Here, the user's movement position derivation module 210 predicts the user position at the future time point Tk+1 on the basis of the current time point Tk, having, as inputs, Pk including each user's position on x-axis and y-axis at the current time point Tk and a moving speed Vk from the user position at the previous time point Tk−1 to the user position at the current time point Tk on each of x-axis and y-axis. Here, k is a positive natural number.

That is, the user's movement position derivation module 210 derives a user's movement position Pk+1 at the future time point Tk+1 and a moving velocity Vk+1 from the current time point TK to the future time point Tk+1 using a Kalman filter. Here, the user's moving position Pk+1 and the moving velocity Vk+1 at the future time point Tk+1 using a Kalman filter is expressed by Equation 1. Here, wk is a white noise component.

$$x_{k+1} = Ax_k + \omega_k \quad \text{[Equation 1]}$$

$$\text{Wherein } x_k = \begin{Bmatrix} P_k \\ V_k \end{Bmatrix},$$

$$x_{k+1} = \begin{Bmatrix} P_{k+1} \\ V_{k+1} \end{Bmatrix} = \begin{Bmatrix} P_k + V_k \cdot \Delta t \\ V_k \end{Bmatrix} + \omega_k, \text{ and}$$

$$A = \begin{bmatrix} 1 & \Delta t & 0 & 0 \\ 0 & 1 & 0 & 0 \\ 0 & 0 & 1 & \Delta t \\ 0 & 0 & 0 & 1 \end{bmatrix}.$$

Meanwhile, the user's movement viewport derivation module 220 derives the user viewport at the future time point Tk+1 using horizontal and vertical movement positions (latitude and longitude) and angular velocity of the user's head direction with respect to the user's head direction at the current time point (Tk).

Here, the user viewport at the future time point Tk+1 derives the moving angular velocity Vk+1 from the current time point TK to the future time point Tk+1 in the user viewport movement position, including the user's head movement position LAk+ in the vertical direction and the user's head movement position LOk+1 in the horizontal direction at a future time point Tk+1, by using a Kalman filter. Here, the moving position Pk+1 and the moving angular velocity Vk+1 of the user's head in the horizontal and vertical directions at the future time point Tk+1 using a Kalman filter are expressed by Equation 2:

$$P_{k+1} = AP_k + \varphi_k, \quad \text{[Equation 2]}$$

$$\text{Wherein } L_k = \begin{pmatrix} LO_k \\ LA_k \end{pmatrix}, V_k = \begin{pmatrix} V_{k,LO} \\ V_{k,LA} \end{pmatrix}, P_k = \begin{pmatrix} L_k \\ V_k \end{pmatrix}, \text{ and}$$

$$P_{k+1} = \begin{Bmatrix} L_{k+1} \\ V_{k+1} \end{Bmatrix} = \begin{Bmatrix} L_k + V_k * \Delta t \\ V_k \end{Bmatrix} + \varphi_k.$$

In addition, the user's final position derivation module 230 may derive the user's final position, based on the image in which the user's movement position at the future time point Tk+1 by the user's movement position derivation module 210, the user's movement viewport at the future time point Tk+1 by the user's movement viewport derivation module 220, and an object in a region of interest of a user are contained.

That is, the user's final position derivation module 230 may predict a user moving route using the user's movement position and the user viewport at the future time point Tk+1, and derive the user's final position, on the basis of the user moving route, which is predicted.

Here, the moving route of the user viewport is predicted on the basis of the object in the region of interest (ROI).

That is, assuming that a window area in the image of the user's current movement section to be predicted is a prediction window (pw), and a window area in the image of the user's previous movement section is a history window (hw), it is possible to set the window pw to be predicted in the image satisfying hw=pw/n (hw<pw). Here, n (natural number) may vary depending on the image.

In addition, the user moving route is derived as $P_0+m*dT$ on the basis of the user position $P_0$ at the current time point Tk in the prediction window pw in the set image.

Here, dT is the duration of one frame to be delivered (17 ms in case of 60 frames/sec), and m is set to M/dT. Here, the user's final position is predicted for a unit time of M seconds (preferably the initial value is set to 2). In this case, M is a natural number that varies according to prediction accuracy. The shorter the unit time is, the better the prediction accuracy is.

In addition, the user final position derivation module 240 corrects the user position and the user viewport moving route that are predicted every M seconds of the unit time according to the movement of the object of interest in the image and obtains the final position of the user at the future time point Tk+1. Here, the user's final position is obtained by reflecting the change of the object of interest in the image, and includes the user viewport and the user position at the future time point.

Figure 6:
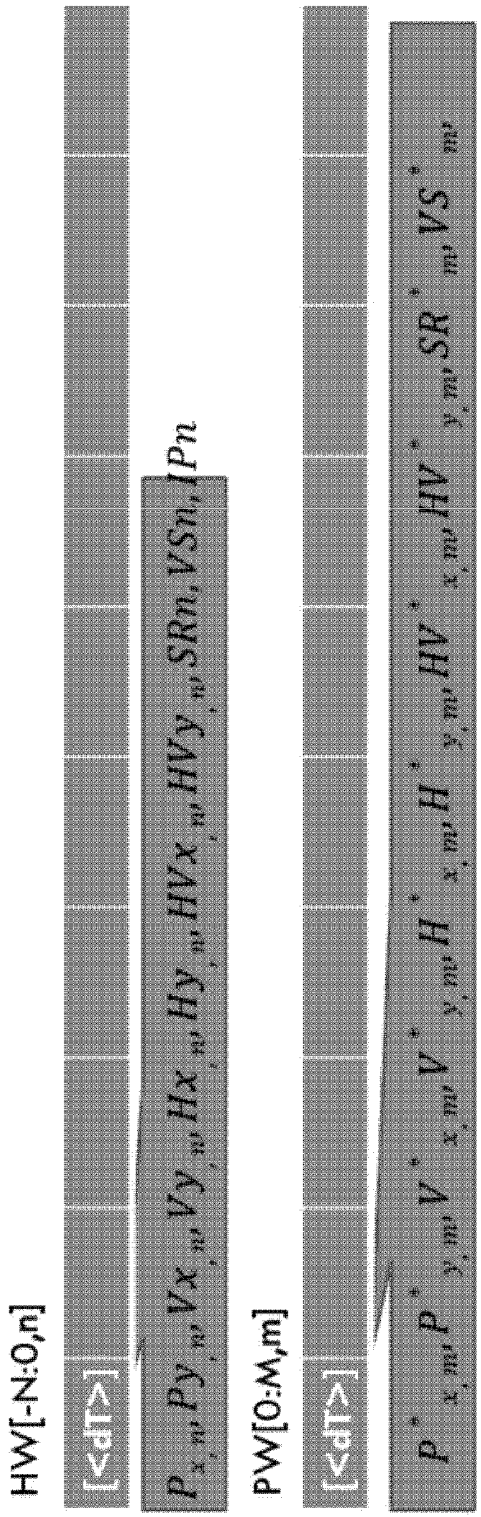
FIG. 6 is an exemplary view showing pw and nw in which an object of interest of FIG. 3 is contained.

FIG. 6 is a view showing a frame structure of an image in which an object of interest is contained. Referring to FIG. 6, a correction value for a user position and a user viewport, which is predicted on the basis of an object of interest, is derived per a frame of the image. That is, referring to FIG. 6, assuming that the previous window hw of the previous image has N slots and the prediction window pw of the following image has M slots, when the direction of the object of interest is V and the direction of head movement is H, the user final position derivation module 240 may derive a relationship between the object of interest in the image in the previous window hw and the user's final position.

Figure 7:
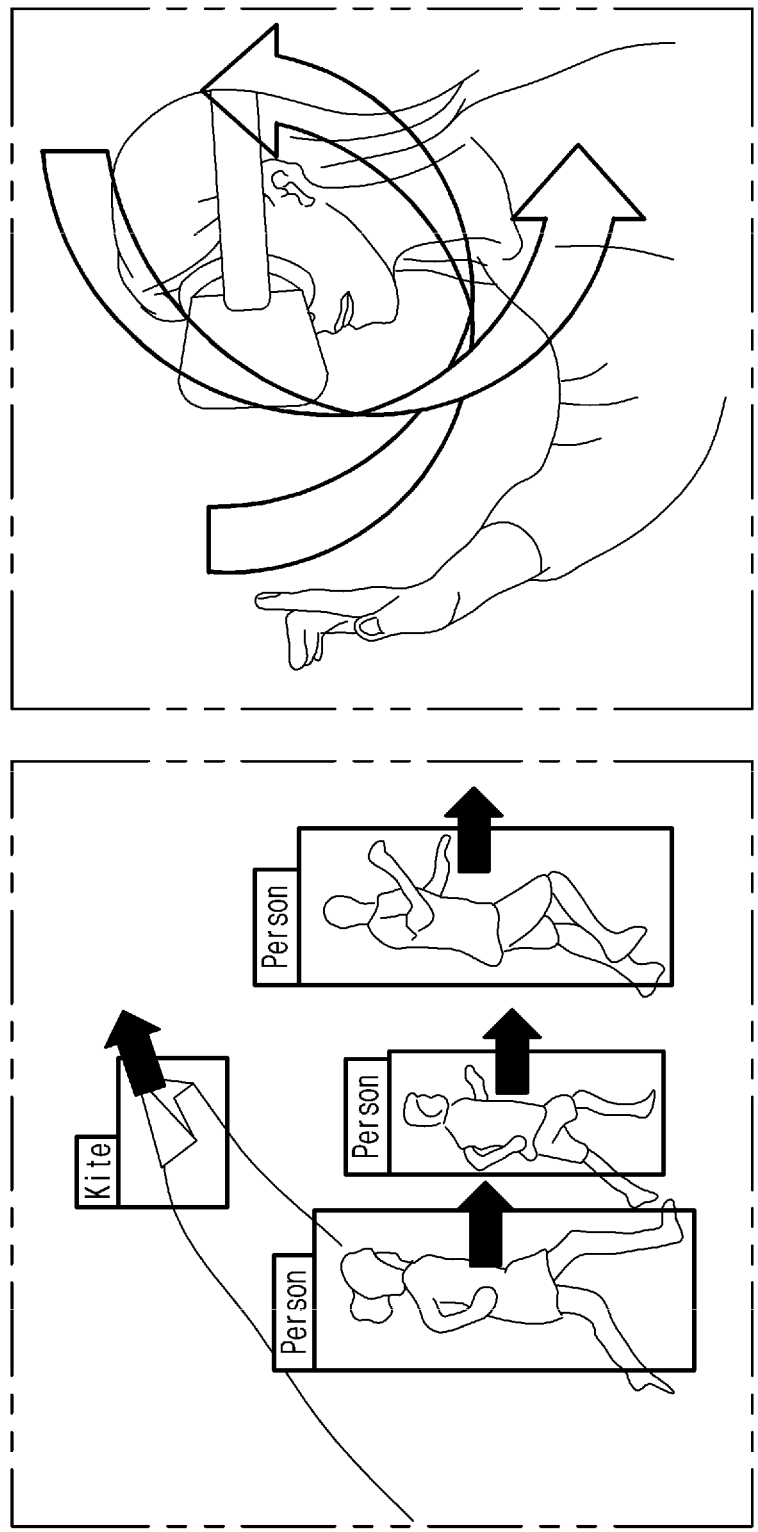
FIG. 7 is an exemplary view showing an object-of-interest moving direction and a head moving direction of FIG. 3.

FIG. 7 is an example view showing the movement of the object of interest and the movement direction of the user's movement viewport. Referring to FIG. 7, when the moving direction Vz of the object of interest z in the previous window hw is the same as the moving direction H of the user viewport, the user's final position derivation module 240 determines that the object of interest has moved in the m-th frame in the prediction window pw, to derive a correction value for the user's movement position that is predicted by a difference between an average change amount of the object of interest in the previous window hw and a change amount of the m-th frame of the object of interest in the prediction window pw.

In addition, the distance between the user's movement position and the object of interest may be expressed as a size SR of the object of interest in the screen. That is, the user's final position derivation module 240 corrects the user's movement position predicted by a difference between a size change of the object of interest and a size change of the object of interest in the m-th frame in the prediction window pw.

In addition, the user's final position derivation module 230 corrects the user's movement position and user's movement viewport predicted by performing multiplication with a weight determined according to the importance IP of the object of interest. Here, the importance IP is set to be high, when the moving direction of the object of interest and the moving direction of the user's head are the same (VS is small), and the size SR of the object of interest is large (proportion of the screen is large).

That is, the user's final position including the user's movement position P*m and the user's movement viewport H*m may be expressed by Equation 3 below, by reflecting the movement direction of the object of interest, the distance between the object of interest and the user, and the importance of the object of interest.

[Equation 3]
$$P_m^* = P(P_{x,m}, P_{y,m}) - $$
$$\beta \sum IP_{N,m} * \left\{ \left( \left( \frac{SR}{dt}[N,0] \right) - (SR_{m-1} - SR_m) * \overrightarrow{H_m} \right) \right\} * dT$$
$$H_m^* = H(H_{x,m}, H_{y,m}) - $$
$$\alpha \sum IP_{N,m} * \left\{ \left( \left( \frac{VS}{dt}[N,0] \right) - (VS_{m-1} - VS_m) * \overrightarrow{V_m} \right) \right\} * dT$$

Here, a ratio SRz of the screen to the object of interest satisfies $$SR_z = \frac{OBx_z * OBy_z}{Screen_x * Screen_y}, SR = \{SR_0, SR_1, SR_2, SR_3, \ldots\},$$

a difference VSz between the movement direction of the object of interest and the movement direction of the user's movement viewport is defined as $$VS_z = \left( \frac{\overrightarrow{V_z}}{|\overrightarrow{V_z}|} - \frac{\overrightarrow{H}}{|\overrightarrow{H}|} \right)^2, VS = \{VS_0, VS_1, VS_2, VS_3, \ldots\},$$

and the importance IPz of object of interest satisfies $$IP_z = SR_z * \frac{1}{VS_z}, IP_{N,m,z} = \sum_{N}^{m} IP_z, IP_{N,m} = \{IP_{N,m,0}, IP_{N,m,1}, \ldots\}.$$

In addition, α, β is a weight for the importance of the object of interest.

Accordingly, the content creation unit 30 may include a content creation module 310, a buffer 320, and a verification module 330, with reference to FIG. 4.

The content creation module 310 produces an image for the user's final position at the future time point set by the future time point setting unit 10 and temporarily saves the produced image in the buffer. Here, the image is created as a synthesis view for the image taken at the previous time point and the produced image segment is saved in the buffer 320.

Meanwhile, the verification module 330 compares the user's final position with the user's actual position, performs verification on the user's final position on the basis of the comparison result, and controls whether to delete the image segment stored in the buffer on the basis of the verification result.

That is, referring to FIG. 6, considering an average adult stride length is 70 cm and the virtual space is divided into a unit block of 35 cm, when the user's final position and the user's actual position are included in the divided block, the verification module 330 determines that the verification of the user's final position is successful. Meanwhile, when the user's final position and the user's actual position are not included in the divided block, the verification module 330 determines that the verification of the user's final position has failed.

In addition, the content creation module 310 repeats a series of steps of deleting the image segment stored in the buffer 320 and then deriving the user's final position at the future time point, when the verification of the user's final position has failed.

In addition, the content creation module 310 transmits the produced image to the HMD of the user terminal S1, when the verification of the user's final position is successful.

Therefore, the user may experience virtual reality as a 360° image suitable for the user's moving position from the user's point of view is played through a HMD of the user terminal S1, and the user may also use a lively content by making the 360° image stereoscopic.

In addition, the user terminal allows producing an image at the future time point, at the user's final position, which is predicted, rather than producing images at every time point, it is possible to reduce the data amount required for creating the content. As the image produced at the user's final position according to the user moving route is stored in the buffer, it is possible to provide smooth content service without delay.

Figure 8:
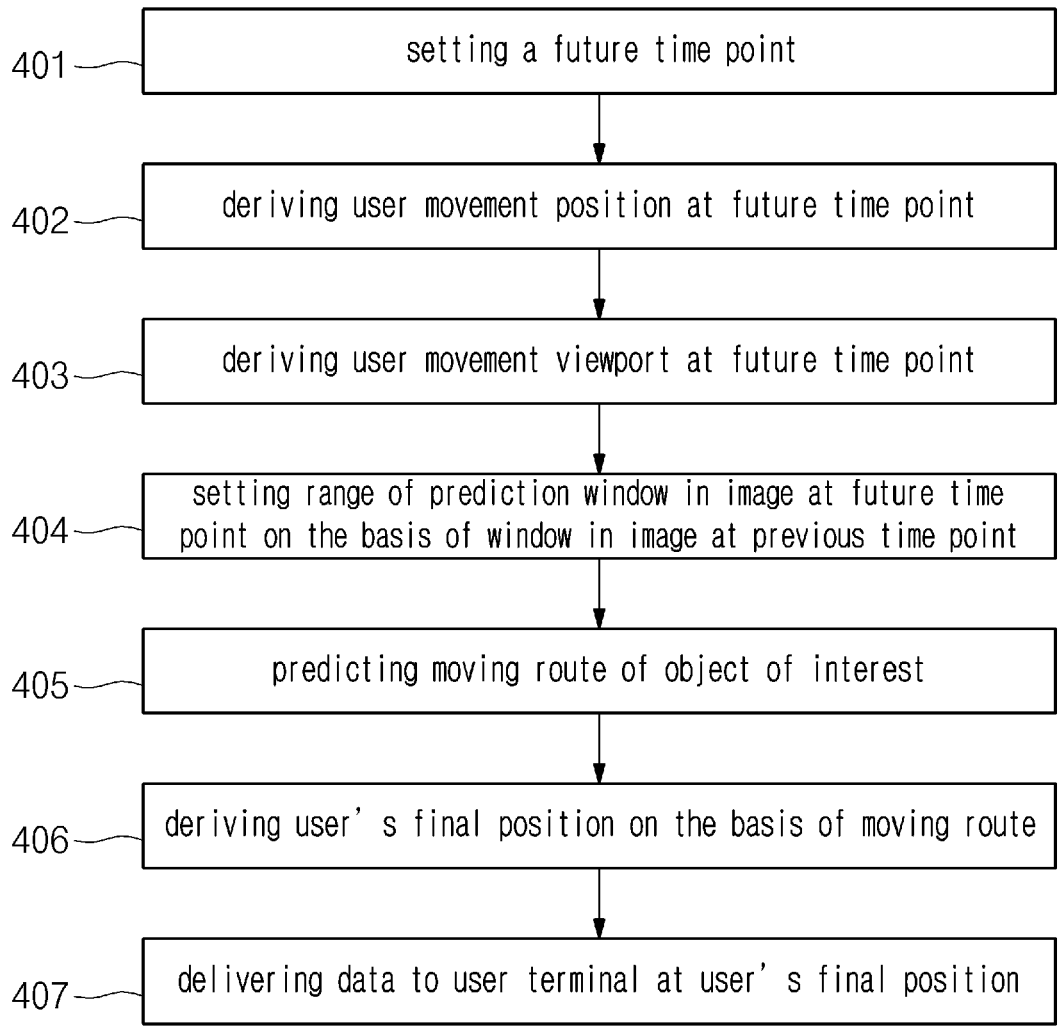
FIG. 8 is an overall flowchart showing a content creation process according to another exemplary embodiment.

FIG. 8 is an overall flowchart showing the operation process of the server shown in FIG. 1. With reference to FIG. 8, a method for delivering moving route prediction-based content according to another embodiment of the present invention will be described.

In step 401, the server S according to an embodiment sets a future time point on the basis of a total delay time of the network. Here, the future time point is set as the total delay time in the network, including a content delivery time, ping time of a simple round-trip time when the content is delivered, and a decoding time performed by the user terminal.

In steps 402 to 406, the server S according to an embodiment predicts a user's final position at the future time point, on the basis of a user position and a user viewport at the current time point. That is, the user's final position is derived, based on an image in which a user's movement position at the future time point Tk+1, a user's movement viewport at the future time point Tk+1, and an object in a region of interest (ROI) of a user are contained.

That is, in step 402, the server S according to an embodiment predicts the user position at the future time point (Tk+1), on the basis of the user position at the current time point (Tk), the user position at the future time point (Tk+1), the user's moving speed, and the moving direction.

In step 403, the server S according to an embodiment predicts the user viewport at the future time point Tk+1 and derives the user's movement viewport, on the basis of the user's head position at the current time point Tk, the user's head position in the vertical and vertical directions at the future time point Tk+1, and the movement angular velocity of the user's head.

In steps 404 to 406, the server S according to an embodiment sets a range of the prediction window in an image at the future time point on the basis of the previous window in an image at the previous time point including the user's object of interest, predicts a route based on the moving direction of the object of interest in the prediction window of the image at the future time point and the previous window of the image at the previous time point, user's movement position and movement viewport, and the importance of the object of interest, and derives the user's final position at the future time point on the basis of the predicted user moving route.

Thereafter, in step 407, the server S according to an embodiment delivers data to at least one user terminal S1 for creating content at the user's final position, which is predicted.

According to an embodiment, as the user terminal allows producing the image at the future time point, at the user's final position, which is predicted, rather than producing images at every time point, it is possible to reduce the data amount required for creating the content, and as the image produced at the user's final position according to the user moving route is stored in the buffer, it is possible to provide content service smoothly without delay.

Although the embodiment of the present invention has been described in detail above, it is noted that the scope of the present invention is not limited thereto, but various modifications and improvements by those skilled in the art using the basic concept of the present invention defined in the following claims also fall within the scope of the present invention.

DESCRIPTION OF REFERENCE NUMERALS

S1: user terminal
S: server
10: future time point setting unit
20: user's final position prediction unit
30: content creation unit
40: content delivery unit
210: user's movement position derivation module
220: user's movement viewport derivation module
230: user final position derivation module
310: content creation module
320: buffer
330: verification module

What is claimed is:

1. A system for delivering moving route prediction-based content, the system including at least one user terminal that receives and plays content created by a server, the sever comprising:
    a future time point setting unit setting a future time point based on a total delay time of a network;
    a user's final position prediction unit predicting a user's final position at a future time point based on a user position and a user viewport at a current time point; and
    a content creation unit creating content at the user's final position predicted,
    wherein the user's final position prediction unit includes:
    a user moving position derivation module predicting the user's position at the future time point (Tk+1) based on a user position at the current time point (Tk), a user position at the future time point (Tk+1), a user's moving speed, and a movement direction;
    a user's movement viewport derivation module predicting the user viewport at the future time point (Tk+1) based on a user's head position at the current time point (Tk), a user's head position in vertical and vertical directions at the future time point (Tk+1), and a movement angular velocity of a user's head; and
    a user final position derivation module deriving the user's final position at the future time point, based on an image in which the user's movement position at the future time point (Tk+1), the user's movement viewport at the future time point (Tk+1), and an object in a region of interest (ROI) of a user are contained, and
    wherein the user final position derivation module is configured to
    set a range of a prediction window in an image at the future time point based on the previous window in an image at the previous time point in which an object of interest of a user is contained;
    predict a user moving route based on a moving direction of the object of interest in the prediction window in the image at the future time point and the previous window in the image at the previous time point, user's movement position and movement viewport, and the importance of the object of interest; and
    derive the user's final position at the future time point based on the user moving route.

2. The system of claim 1, wherein the future time point setting unit is configured to set the future time point based on the total delay time of the network, including a content delivery time, a ping time of a simple round-trip time when the content is delivered, and a decoding time performed by the user terminal.

3. The system of claim 1, wherein the content creation unit includes:
    a content creation module creating content at the user's final position; and
    a buffer storing image segments of the created content at the future time point and then sequentially delivering the stored content to the user terminal through the network.

4. The system of claim 3, wherein the content creation unit further includes a verification module that is configured to
    divide the virtual space of the created content into blocks of a predetermined unit, and then compare a block at the user's final position with a block at the user's actual position; and
    determine that the verification of the user's final position is successful when the comparison results in a match, and then sequentially deliver the image segments stored in the buffer at the future time point.

5. The system of claim 4, wherein the verification module is configured to determine that the verification of the user's final position is not successful when the comparison results in a non-match, and delete the created content at the future time point and then repeatedly perform prediction of the user's final position at the future time point.

6. A method of delivering moving route prediction-based content, using at least one user terminal that receives and plays content created by a server, the method comprising:
   setting a future time point based on a total delay time of a network;
   predicting a user's final position including a user position and a user viewport at a future time point based on a user position and a user viewport at a current time point; and
   creating content at the user's final position,
   wherein the deriving of the user's final position includes when deriving the user's final position, based on an image in which the user's movement position at the future time point (Tk+1), the user movement viewport at the future time point (Tk+1), and an object in a region of interest of a user are contained,
   setting a range of a prediction window in an image at the future time point based on the previous window in an image at the previous time point in which an object of interest of a user is contained;
   predicting a user moving route based on a moving direction of the object of interest in the prediction window in the image at the future time point and the previous window in the image at the previous time point, user's movement position and movement viewport, and the importance of the object of interest; and
   deriving the user's final position at the future time point based on the user moving route.

7. The method of claim 6, wherein the setting of the further time point includes setting the future time point based on the total delay time of the network, including a content delivery time, a ping time of a simple round-trip time when the content is delivered, and a decoding time performed by the user terminal.

8. The method of claim 6, wherein the predicting of the user's final position includes deriving the user's final position, based on an image in which the user's movement position at the future time point (Tk+1), the user movement viewport at the future time point (Tk+1), and an object in a region of interest of a user are contained.

9. A system for delivering moving route prediction-based content, the system including at least one user terminal that receives and plays content created by a server, the sever comprising:
   a future time point setting unit setting a future time point based on a total delay time of a network;
   a user's final position prediction unit predicting a user's final position at a future time point based on a user position and a user viewport at a current time point; and
   a content creation unit creating content at the user's final position predicted,
   wherein the content creation unit includes:
   a content creation module creating content at the user's final position; and
   a buffer storing image segments of the created content at the future time point and then sequentially delivering the stored content to the user terminal through the network,
   wherein the content creation unit further includes a verification module that is configured to
   divide the virtual space of the created content into blocks of a predetermined unit, and then compare a block at the user's final position with a block at the user's actual position; and
   determine that the verification of the user's final position is successful when the comparison results in a match, and then sequentially deliver the image segments stored in the buffer at the future time point.

* * * * *